US012746917B2

(12) United States Patent
Ivanovic et al.

(10) Patent No.: US 12,746,917 B2
(45) Date of Patent: Sep. 29, 2026

(54) LANE-BASED VEHICLE OPERATIONS

(71) Applicant: Ford Global Technologies, LLC, Dearborn, MI (US)

(72) Inventors: Vladimir Ivanovic, Canton, MI (US); Andreas Ortseifen, Eschweiler (DE); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 730 days.

(21) Appl. No.: 17/542,560

(22) Filed: Dec. 6, 2021

(65) Prior Publication Data

US 2023/0174059 A1 Jun. 8, 2023

(51) Int. Cl.
*B60W 30/12* (2020.01)
*B60W 40/072* (2012.01)

(52) U.S. Cl.
CPC .......... *B60W 30/12* (2013.01); *B60W 40/072* (2013.01); *B60W 2520/10* (2013.01); *B60W 2552/00* (2020.02)

(58) Field of Classification Search
CPC ............... B60W 30/12; B60W 40/072; B60W 2520/10; B60W 2552/00; B60W 50/0098; B60W 30/10; B60W 2050/0008; B60W 2050/0012; B60W 2552/10; B60W 2552/30; B60W 30/18145
See application file for complete search history.

(56) References Cited

U.S. PATENT DOCUMENTS

| | | | | |
|---|---|---|---|---|
| 6,279,674 | B1 * | 8/2001 | Lissel | B62D 5/003 180/405 |
| 8,170,739 | B2 | 5/2012 | Lee | |
| 9,233,711 | B2 | 1/2016 | Oyama | |
| 10,145,953 | B2 | 12/2018 | Talamonti et al. | |
| 10,179,605 | B2 | 1/2019 | Tamura | |
| 10,600,324 | B2 | 3/2020 | Fujii | |
| 10,843,711 | B2 * | 11/2020 | Takagi | G01C 21/26 |
| 2019/0071126 | A1 | 3/2019 | Giersiefer et al. | |
| 2020/0385018 | A1 * | 12/2020 | Kameoka | B60W 60/0011 |
| 2021/0129838 | A1 | 5/2021 | Hulten et al. | |

(Continued)

OTHER PUBLICATIONS

Yixiu Sun, Xiaoqing Li, Ying Luo, Xuedong Chen, Lizhan Zeng, “Iterative Tuning of Feedforward Controller with Precise Time-Delay Compensation for Precision Motion System”, Mathematical Problems in Engineering, vol. 2020, Article ID 9391526, 23 pages, 2020. https://doi.org/10. 1155/2020/9391526 (Year: 2020).*

(Continued)

*Primary Examiner* — Thomas E Worden
*Assistant Examiner* — Bryant Tang
(74) *Attorney, Agent, or Firm* — Frank A. MacKenzie; Brooks Kushman P.C.

(57) ABSTRACT

A system for a vehicle can include a computer having a processor and a memory, the memory storing instructions executable by the processor, including instructions to determine a curvature command for a vehicle based on a feed-forward control action based on a road curvature, a feedback control action based on at least one of a path offset or a heading offset of a vehicle with respect to a line defining a target lane; and to operate the vehicle with respect to the line defining the target lane based on the curvature command.

17 Claims, 7 Drawing Sheets

(56) References Cited

U.S. PATENT DOCUMENTS

| | | | | |
|---|---|---|---|---|
| 2021/0387613 | A1* | 12/2021 | Laine | B60W 10/12 |
| 2023/0026680 | A1* | 1/2023 | Kim | B60W 40/072 |

OTHER PUBLICATIONS

Yixiu Sun, Xiaoqing Li, Ying Luo, Xuedong Chen, Lizhan Zeng, "Iterative Tuning of Feedforward Controller with Precise Time-Delay Compensation for Precision Motion System", Mathematical Problems in Engineering, vol. 2020, Article ID 9391526 (Year: 2020).*

Wang, Y., et al., "Lane detection using spline model," NH Elsevier, Pattern Recognition Letters 21, Feb. 8, 2000, 13 pages.

Papadimitriou, I, et al., Fast Lane Changing Computations using Polynomials, Department of Mechanical Engineering, University of California at Berkeley, Proceedings of the Amenican Control Conference, Denver. Colorado Jun. 4-6, 2003, 6 pages.

Tseng, H., et al., "Evasive manoeuvres with a steering robot," Vehicle System Dynamics: International Journal of Vehicle Mechanics and Mobility, vol. 43, No. 3, Mar. 2005, pp. 199-216.

Werling, M., et al., "Optimal Trajectory Generation for Dynamic Street Scenarios in a Fren et Frame," 2010 IEEE International Conference on Robotics and Automation, Anchorage Convention District, May 3-8, 2010, 7 pages.

* cited by examiner

*Lane Change Control with implicit path generation*

*Lane Change Control with explicit path generation*

LANE-BASED VEHICLE OPERATIONS

BACKGROUND

Advanced Driver Assist Systems (ADAS) in a vehicle can include systems for lane-based operations, including lane-centering and/or lane-change operations such as providing user output based on a vehicle's position in a lane and/or controlling the vehicle with respect to its position in a lane. Operating the vehicle with respect to its position in a lane can include controlling one or more of steering, propulsion, and/or braking. Lane-centering typically includes operating the vehicle to maintain a vehicle path with reference to a determined reference line for the lane, typically a lane center line, that can be straight and/or curved. Lane-changing typically includes operating the vehicle to move from a first lane of travel to a second lane of travel and/or operating the vehicle to abort an intended change of lanes.

DETAILED DESCRIPTION

Overview

Figure 1:
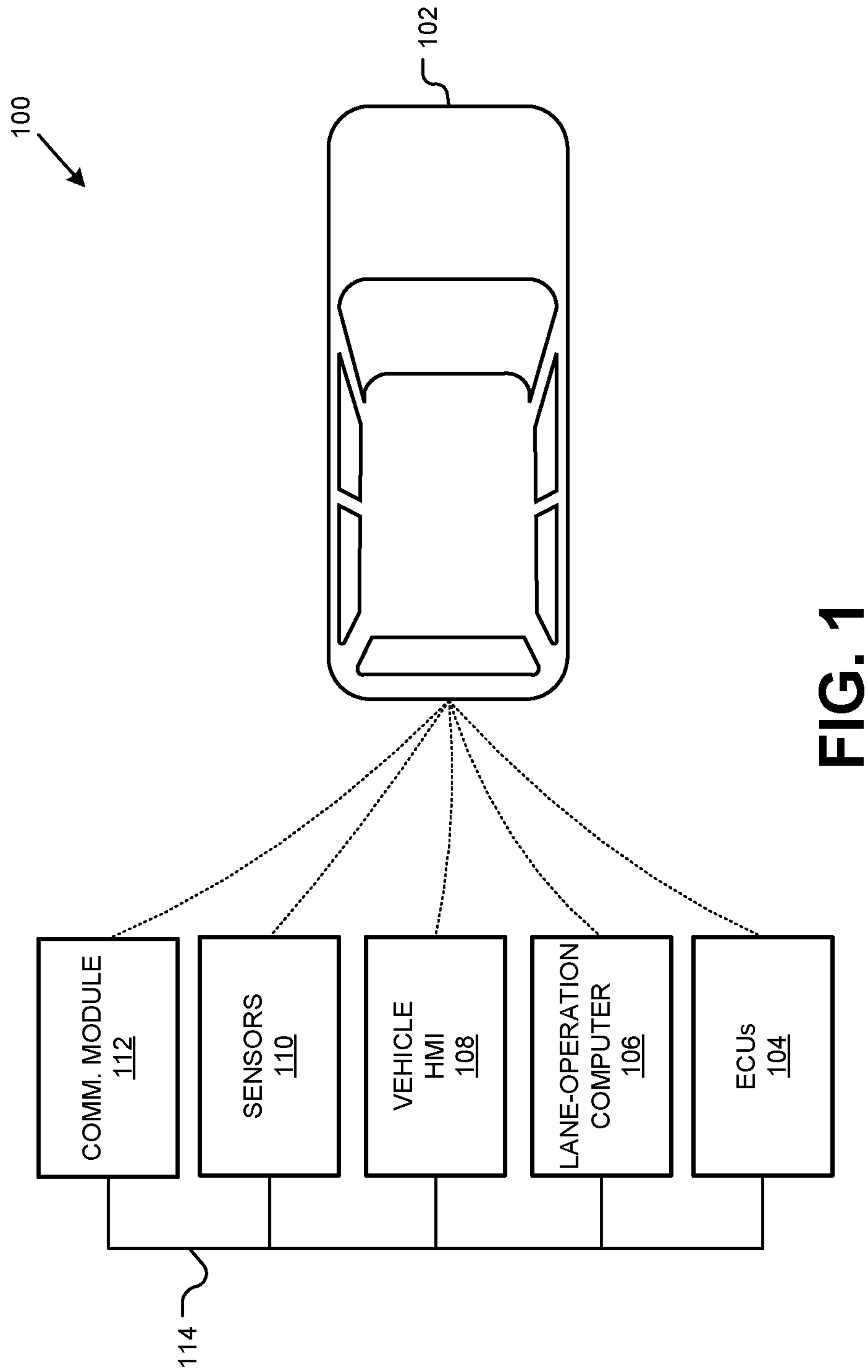
FIG. 1 illustrates an example vehicle including various elements for operating the vehicle.

Disclosed herein are techniques for improved lane-based vehicle operations, and including improved lane-change operations and lane-centering for a vehicle, achieved with a control rule that implements both feedforward and feedback terms as input. The feedforward term compensates for changing road curvature. The feedback term provides state feedback including measured states of the vehicle. The measured states of the vehicle describe orientation of the vehicle relative to a line defining the target lane, typically a lane center of the target lane (i.e., a lane into which the vehicle plans to continue travel or into which the vehicle plans to move); the measured states can be given by the vehicle's lateral offset (i.e., lateral distance from the line such as the lane center) and heading angle (i.e., deviation from a line parallel or tangent to line defining the target lane such as the lane center). Where there are large lateral offsets, rate and amplitude limiting of the feedback action can be implemented to avoid undesirably large lateral jerks and/or lateral acceleration as a vehicle path is followed to move the vehicle toward the target lane center. Further, a new calibration approach is included that can adjust the state feedback gains to achieve desired system damping, closed loop bandwidth, and/or 0-95% set point response time.

The lateral control in including lane-centering and lane-change control described herein can be implemented according to various approaches. For example, a first approach includes implicit path generation and planning in the vehicle. That is, this first approach integrates both path planning and path following. This approach provides implicit, smooth, and seamless re-planning in case of unexpected vehicle motion which may arise from unintended steering wheel movement, and in case of an abrupt path offset change in the event of a lane-change abort, i.e., a decision to return to or remain in an original lane of travel. In a second exemplary approach, the control rule is implemented to make use of explicit path generation. This second approach includes all properties of the approach without explicit path generation, and additionally allows for compensation of sensing and unmodeled actuation dynamics in the computation of desired lateral and heading offsets.

In accordance with this disclosure, a system for a vehicle can comprise a processor and a memory (e.g., in a computer or computing device), the memory storing instructions executable by the processor, including instructions to determine a curvature command for a vehicle based on a feedforward control action based on a road curvature, a feedback control action based on at least one of a path offset or a heading offset of a vehicle with respect to a line defining a target lane; and then operate the vehicle with respect to the line defining the target lane based on the curvature command.

The system of claim 1, the target lane can be a current lane of travel or can be adjacent to the current lane of travel. The line defining the target lane is a center of the target lane. The road curvature can be determined based on an assumption that the heading offset can be less than a specified angle. The feedforward control action can be further based on a feedforward gain. The feedforward control action can be further based on a longitudinal speed of the vehicle. The feedforward control action can be further based on a time to actuate a vehicle component. The feedback control action can be further based on the path offset and the heading offset.

At least one of the path offset or the heading offset can be derived in part from a desired closed-loop control system natural frequency and a longitudinal speed of the vehicle. The heading offset can be derived in part from a desired closed-loop control system damping ratio. The heading offset and the path offset can be each derived based on a response time to reach a specified percentage of a target path offset value, wherein the response time can be based on the desired closed-loop control system natural frequency and a damping ratio.

Determining the target curvature can be constrained by at least one of amplitude or rate limits derived in a lateral acceleration domain. The curvature command can be based in part on a correction term that accounts for differences between measured and desired path and heading offsets determined in a path-following subsystem. The desired path and heading offsets are obtained by accounting for actuation and sensing delays. A response time for path following can be less than a response time for path generation. The feedforward control action can be further based on a road curvature rate.

A method can comprise determining a curvature command for a vehicle based on a feedforward control action based on a road curvature, a feedback control action based on at least one of a path offset or a heading offset of a vehicle with respect to a line defining a target lane; and then operating the vehicle with respect to the line defining the target lane based on the curvature command. The target lane can be one of a current lane of travel or a lane adjacent to the current lane of travel. The feedback control action can be further based on the path offset and the heading offset, and wherein at least one of the path offset or the heading offset are derived in part from a desired closed-loop control system natural frequency and a longitudinal speed of the vehicle.

Example System

Referring now to FIG. 1, a vehicle system 100 for a vehicle 102 can include a plurality of computing devices, including electronic controllers such as one or more ECUs 104 (electronic control units) or the like, for example. One of the computing devices in the vehicle 102, referred to herein separately for convenience as the lane operation computer 106, may be an ECU, for example. The lane operation computer 106 can include, or be connected to a network interface that is connectable to a vehicle network 114. The lane operation computer 106 can implement various aspects of planning and/or controlling a vehicle 102 path, e.g., in a lane-centering or lane-change scenario as described herein.

The vehicle 102 can include, in addition to one or more computing devices, e.g., the lane operation computer 106 and a plurality of ECUs 104, a human-machine interface, e.g., HMI 108, a plurality of sensors 110, and a communication module 112 to provide communications via a wide area network 116 to other vehicles 102 and/or one or more central computers. ECUs 104 can receive data from various of the sensors 110 and/or computing devices in the vehicle 102 to support operation of various vehicle 102 features or subsystems, e.g., lane-changing and/or lane-keeping implemented in the lane operation computer 106. Alternatively or additionally, ECUs 104 in a vehicle 102 can utilize data received from outside the vehicle 102 to operate a vehicle subsystem, e.g., from a central computer and/or one or more other vehicles 102.

A vehicle 102 may be any suitable type of ground vehicle 102, e.g., a passenger or commercial automobile such as a sedan, a coupe, a truck, a sport utility, a crossover, a van, a minivan, a taxi, a bus, etc.

Vehicle 102 computing devices can include a plurality of computers as mentioned above, such as ECUs 104 and a lane operation computer 106 mentioned above. A vehicle 102 computer 104, 106 includes a processor and a memory. The memory includes one or more forms of computer readable media, and stores instructions executable by the vehicle 102 computer for performing various operations, including as disclosed herein.

For example, a vehicle 102 computer can be a generic computer with a processor and memory as described above and/or may include an ECU 104 or controller for a specific function or set of functions, and/or a dedicated electronic circuit including an ASIC that is manufactured for a particular operation, e.g., an ASIC for processing sensor 110 data and/or communicating the sensor 110 data. In another example, a vehicle 102 computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

The memory can be of any type, e.g., hard disk drives, solid state drives, servers, or any volatile or non-volatile media. The memory can store the collected data output from the sensors 110. The memory can be a separate device from the computer, and the computer can retrieve information stored by the memory via a network in the vehicle 102, e.g., over a CAN bus, a wireless network, etc. Alternatively or additionally, the memory can be part of a computer, e.g., as a memory of an ECU 104 or the like.

A computer such as an ECU 104 may include programming to operate one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer, as opposed to a human operator, is to control such operations. Additionally, a computer may be programmed to determine whether and when a human operator is to control such operations.

A computer including the lane operation computer 106 and ECUs 104 may include or be communicatively coupled to, e.g., via a vehicle network 114 (as described further below) such as a communications bus, more than one processor, e.g., included in components such as sensors 110, other ECUs 104 or the like included in the vehicle 102 for monitoring and/or controlling various vehicle components, e.g., a powertrain controller, a brake controller, a steering controller, etc. Vehicle 102 computing devices are generally arranged for communications on a vehicle 102 communication network that can include a bus in the vehicle 102 such as a controller area network (CAN) bus or the like, and/or other wired and/or wireless mechanisms. Alternatively or additionally, in cases where a computer actually comprises a plurality of devices, e.g., as is possible concerning the lane operation computer 106 (described herein as implemented as one computing device for convenience), the vehicle 102 communication network may be used for communications between devices represented as one computing device in this document. Further, as mentioned below, various controllers and/or sensors 110 may provide data to vehicle 102 computing devices via the vehicle 102 communication network.

As mentioned above, a vehicle 102 can include an HMI 108, e.g., one or more of a display, a touchscreen display, a microphone, a speaker, etc. The user can provide input to devices such as the computer via the HMI 108. The HMI 108 can communicate with a vehicle 102 computing device via the vehicle network 114, e.g., the HMI 108 can send a message including the user input provided via a touchscreen, microphone, a camera that captures a gesture, etc., to a computer, and/or can display output, e.g., via a screen, speaker, etc.

Vehicles 102, such as autonomous or semi-autonomous vehicles 102, typically include a variety of sensors 110. A sensor 110 is a device that can obtain one or more measurements of one or more physical phenomena. Some sensors 110 detect internal states of the vehicle 102, for example, wheel speed, wheel orientation, and engine and transmission variables. Some sensors 110 detect the position or orientation of the vehicle 102, for example, global positioning system 100 (GPS) or Global Navigation Satellite System 100 (GNSS) sensors 110; accelerometers such as piezo-electric or microelectromechanical systems 100 MEMS;

gyroscopes such as rate, ring laser, or fiber-optic gyroscopes; inertial measurements units IMU; and magnetometers. Some sensors 110 detect the external world, for example, radar sensors 110, scanning laser range finders, light detection and ranging LIDAR devices, and image processing sensors 110 such as cameras. A LIDAR device for example detects distances to objects by emitting laser pulses and measuring the time of flight for the pulse to travel to the object and back. Some sensors 110 are communications devices, for example, vehicle-to-infrastructure V2I or vehicle-to-vehicle V2V devices. Sensor 110 operation can be affected by obstructions, e.g., dust, snow, insects, etc. Often, but not necessarily, a sensor 110 includes a digital-to-analog converter to converted sensed analog data to a digital signal that can be provided to a digital computer, e.g., via a network.

Sensors 110 can include a variety of devices, and can be disposed to sense and environment, provide data about a machine, etc., in a variety of ways. For example, a sensor 110 could be mounted to a stationary infrastructure element on, over, or near a road, and sensor 110 data could be wirelessly and in real-time or near real-time provided to a vehicle 102 via a central computer or other mechanisms. Moreover, various ECUs 104 in a vehicle 102 may operate as sensors 110 to provide data via the vehicle network 114 or bus, e.g., data relating to vehicle 102 speed, acceleration, location, subsystem and/or component status, etc. Further, other sensors 110, in or on a vehicle 102, stationary infrastructure element, etc., infrastructure could include cameras, short range radar, long range radar, LIDAR, and/or ultrasonic transducers, weight sensors 110, accelerometers, motion detectors, etc., i.e., sensors 110 to provide a variety of data. To provide just a few non-limiting examples, sensor 110 data could include data for determining a position of a component, a location of an object, a speed of an object, a type of an object, a slope of a roadway, a temperature, a presence or amount of moisture, a fuel level, a data rate, etc.

The computer 106 and/or ECUs 104 may be configured for communicating via a vehicle 102 to vehicle 102 communication module 112 or interface with devices outside of the vehicle 102, e.g., through vehicle 102 to vehicle 102 V2V, vehicle-to-infrastructure or everything V2X or vehicle-to-everything including cellular communications C-V2X wireless communications cellular, DSRC., etc. to another vehicle 102, to an infrastructure element typically via direct radio frequency communications and/or typically via the network a remote server. The module could include one or more mechanisms by which the computers of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications (DSRC), cellular V2X (CV2X), and the like.

The vehicle network 114 is a digital network via which messages can be exchanged between various devices in vehicle 102. Computer can be generally programmed to send and/or receive, via vehicle network 114, messages to and/or from other devices in vehicle 102 e.g., any or all of ECUs 104, sensors 110, actuators, components, communications module, a human machine interface HMI 108, etc. Additionally or alternatively, messages can be exchanged among various such other devices in vehicle 102 via vehicle network 114.

In some implementations, as mentioned above, the vehicle network 114 can be a network in which messages are conveyed via a vehicle 102 communications bus. For example, vehicle network 114 can include a controller area network CAN in which messages are conveyed via a CAN bus, or a local interconnect network LIN in which messages are conveyed via a LIN bus. In some implementations, vehicle network 114 can include a network in which messages are conveyed using other wired communication technologies and/or wireless communication technologies e.g., Ethernet, WiFi, Bluetooth, etc. Additional examples of protocols that may be used for communications over vehicle network 114 in some implementations include, without limitation, Media Oriented System Transport (MOST), Time-Triggered Protocol TTP, and FlexRay.

In some implementations, vehicle network 114 can represent a combination of multiple networks, possibly of different types, that support communications among devices in vehicle 102. For example, vehicle network 114 can include a CAN in which some devices in vehicle 102 communicate via a CAN bus, and a wired or wireless local area network in which some device in vehicle 102 communicate according to Ethernet or Wi-Fi communication protocols.

A computer can be programmed to communicate with one or more remote sites such as a central server via a wide area network (not shown). The wide area network can include one or more mechanisms by which a vehicle 102 computer may communicate with, for example, a remote central server, one or more road-side infrastructure units (RSUs), etc. Accordingly, the wide-area network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 102 to everything V2X such as cellular V2X CV2X, Dedicated Short Range Communications DSRC, etc., local area networks LAN and/or wide area networks 116 WAN, including the Internet, providing data communication services.

Vehicle Dynamics and Vehicle-Road Kinematics

Figure 2:
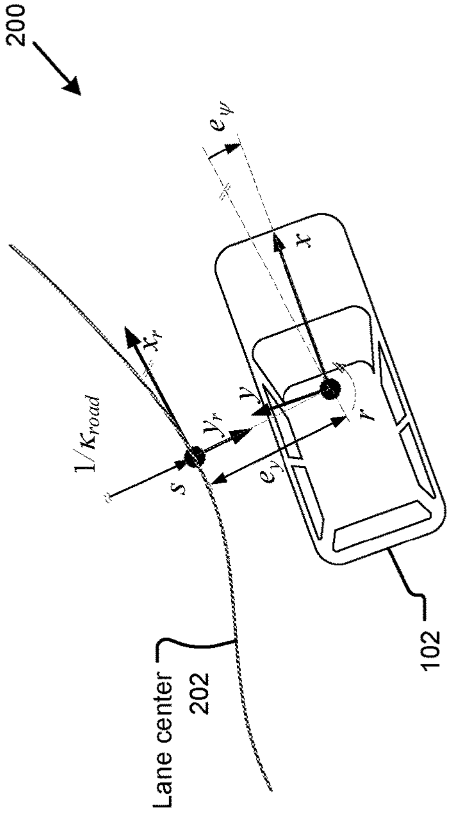
FIG. 2 illustrates an example coordinate frame for describing motion dynamics, i.e., kinematics, of a vehicle.

FIG. 2 illustrates an example coordinate frame 200 for describing motion dynamics, i.e., vehicle-road kinematics, of a vehicle 102. Kinematics of a vehicle means a geometric description of motion of the vehicle. The vehicle kinematics can be described with respect to a conventionally understood curvilinear Frenet-Serret coordinate frame ($x_r$–$y_r$). States of the vehicle 102 describing vehicle-road kinematics include a travel distance represented by movement of a coordinate s along a curvilinear line defining a lane center 202, a path offset $e_y$, and a heading offset $e_\psi$. The curvature of the road is considered to be an exogenous input (i.e., external to the set of data comprising vehicle state(s)) and is denoted by $\kappa_{road}$ Vehicle motion data, e.g., longitudinal velocity $V_x$, lateral velocity $V_y$, and yaw rate r, are described with respect to a Cartesian coordinate system with orthogonal x and y axis having an origin at a point on a vehicle 102 (typically a vehicle 102 center point, i.e., a location where a longitudinal center axis intersects a lateral center axis). Vehicle motion curvature (i.e., turning radius) $\kappa_{veh}$ is defined as $\kappa_{veh}=r/V_x$ for $V_x\neq 0$. Alternatively, the curvature can be computed based on the steering angle $\delta_{sw}$ as $K_{veh}=\delta_{sw}/i_{sr}/(L+K_u V_x)$ where $i_{sr}$ is the steering system ratio (i.e., ratio of turning the steering wheel to turning the wheels), L is the vehicle wheelbase, and $K_u$ is the vehicle understeering gradient in units of rad-$s^2$/m. The understeer gradient is defined as: $K_u=m_f/C_f-m_r/C_r$ where $m_f$ and $m_r$ are vehicle 102 front and rear axle masses, respectively, and $C_f$ and $C_r$ are front and rear axle cornering coefficients of the vehicle 102, respectively.

Based on a coordinate frame defined as explained in the preceding paragraph, vehicle kinematics can be described as represented in Equations 1-3:

$$\dot{e}_y = V_x \text{sin} e_\psi - V_y \text{cos} e_\psi \quad (1)$$

$$\dot{e}_\psi = \kappa_{road}\dot{s} - r \quad (2)$$

$$\dot{s} = \frac{1}{1-\kappa_{road}e_y}(V_x \text{cos} e_\psi - V_y \text{sin} e_\psi) \quad (3)$$

For the present lane-centering and lane-change techniques, we can take advantage of the fact that the heading offset, the product of road curvature and heading offset, and lateral velocity are small enough for the following approximation to be valid for present purposes. The vehicle-road kinematics can then be reduced to:

$$\dot{e}_y = V_x e_\psi \quad (4)$$

$$\dot{e}_\psi = V_x(\kappa_{road} - \kappa_{veh}) \quad (5)$$

$$\dot{s} = V_x \quad (6)$$

Exemplary Control System for Lane-Centering

Figure 3:
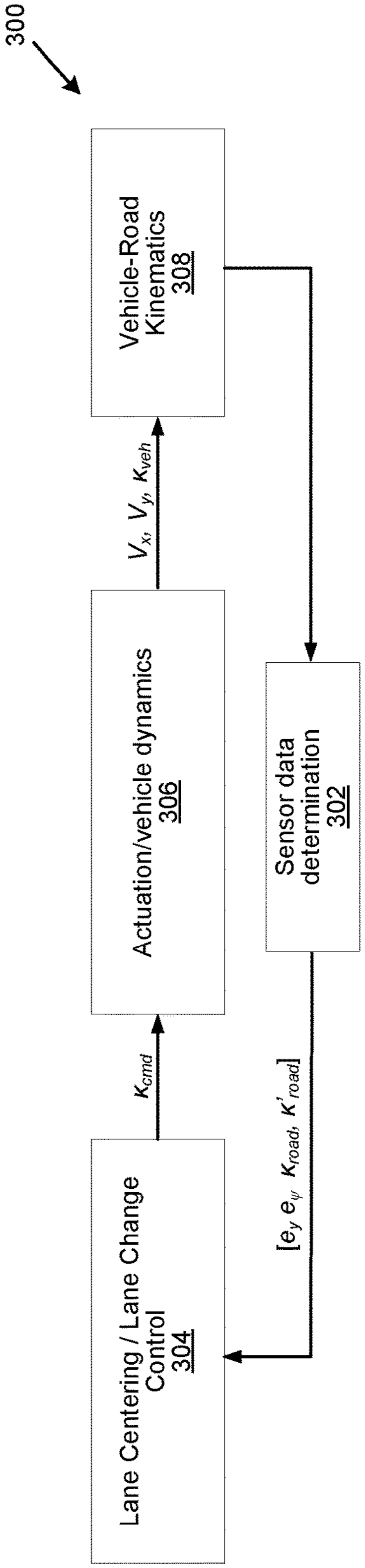
FIG. 3 is a block diagram illustrating an exemplary control system for lane-centering and/or lane-changing.

FIG. 3 is a block diagram illustrating an exemplary control system 300 for lane-centering, possibly including centering with respect to a target lane, i.e., lane-changing, as discussed further below. The control system 300 (and also the control systems 400, 500 discussed below with regard to FIGS. 4 and 5) includes, as can be seen and as will be discussed, feedforward and feedback control terms (e.g., see the feedback and feedforward terms in Equation (12) below) that are used to generate a control action (e.g., see the curvature command $\kappa_{Cmd}$ in Equation (12) below). In other words, control actions, i.e., values describing an output of a system 300, 400, 500 (such as a specified curvature or curvature command $\kappa_{Cmd}$) that can then be applied to a physical machine by a vehicle, are determined by a model that includes various equations as described herein. Control actions, and the component feedback and feedforward terms that may be included in a control action, use parameters and control variables. Parameters are values defined to calibrate or tune a system 300, 400, 500, e.g., in Equation (12) below parameters include the path offset gain $K_y$ and heading offset gain $K_\psi$. Control variables are values representing various physical quantities input to and/or determined by a system 300, 400, 500, e.g., in Equation (12) below, path offset $e_y$, heading offset $e_\psi$, are control variables.

The control system 300 includes control loop with a sensor data determination block 302, which outputs vehicle 102 state values determined by data from vehicle sensors 110. For example, according to a conventional technique, a path offset $e_y$, heading offset $e_\psi$, and road curvature $\kappa_{road}$ are obtained through image processing of video frames taken from a front view camera sensor 110, and by fitting lane markers detected in the video frames with a $3^{rd}$ order polynomial. Coefficients of lane marker polynomials so obtained can then be fused to obtain coefficients of a lane center polynomial with respect to a vehicle coordinate frame; the resulting polynomial is conventionally referred to as a path polynomial, where:

$$y_{path} = a_0 + a_1x + a_2x^2 + a_3x^3. \quad (7)$$

In format of Equation 7, the coefficients $a_0$ and $a_1$ are equivalent to the path offset $e_y$ and the heading offset $e_\psi$, respectively (see FIG. 2). Coefficients $a_2$ and $a_3$ are related to the road curvature $\kappa_{road}$ and a curvature rate $$\kappa'_{road} = d\kappa_{road}/dx,$$

respectively (see Equations (10) and (11) and discussion thereof below). Based on vector differential calculus, a curvature of a parametric curve y=y(x) in the x-y plane is given by:

$$\kappa(x) = \frac{y''(x)}{\left(1+y'(x)^2\right)^{3/2}} \quad (8)$$

where y'=dy/dx. Computing $y_{path}'$ and $$y''_{path}$$

from Eq. (7) and replacing with y' and y" in Equation (8) gives:

$$\kappa(x) = \frac{2a_2 + 6a_3x}{\left(1+\left(a_1+2a_2x+3a_3x^2\right)^2\right)^{3/2}} \quad (9)$$

Next, it can be assumed that the heading offset $a_1$ is small enough to be ignored. This assumption is typically justified because in most highway driving situations the heading offset can be assumed to be less than a specified angle, e.g., five degrees or less ($a_1 \leq 5°$) at typical highway speeds; hence the error introduced by the small heading offset assumption is smaller than 1%. Thus, the curvature and curvature rate of the path (road) at a coordinate frame origin (x=0) are equal to:

$$\kappa_{road} = 2a_2 \quad (10)$$

$$\kappa'_{road} = 6a_3 \quad (11)$$

Continuing with FIG. 3, output from sensor data determination block 302 is received in a lane-centering and/or lane-change control block 304. The control block 304 outputs a vehicle motion curvature command $\kappa_{Cmd}$, which specifies a vehicle curvature to be achieved by actuation of vehicle components including steering, propulsion, and/or braking, i.e., a specification of a target vehicle curvature (i.e., turning radius). Actuation of vehicle components, e.g., steering, braking, and/or propulsion to achieve the target curvature in actuation/vehicle dynamics blocks 306 results in values for $V_x$ and $V_y$ vehicle longitudinal and lateral velocity, respectively) and $K_{veh}$ (vehicle curvature) being provided to vehicle-road kinematics block 308, $\kappa_{road}$ is road curvature.

Actuation/vehicle dynamics determined in the block 308 are values that result from actuation of vehicle components, e.g., a delay that may exist between an actuation command to steering, braking, or propulsions, for example, and the command actually being implemented, an actual curvature, velocity, etc., that may result from an actuation command, etc. In contrast to vehicle-road kinematics, which are data specifying a relation of vehicle geometry to geometry of a specific road on which a vehicle 102 is traveling, actuation/vehicle dynamics refers to motion data of the vehicle without reference to a specific road, e.g., vehicle curvature, longitudinal and lateral velocity, etc., that will result from actuation commands, e.g., accounting for actuation delays, imprecision of actuators, etc. That is, the block 308 models a dynamic relationship between the curvature command $\kappa_{cmd}$ and the actual curvature followed by the vehicle 102. That is, as will be appreciated, due to physical and mechanical limitations, a step change in a curvature command cannot be achieved or actuated instantaneously. Instead, one might observe a behavior in which, for example, output increases towards and then possibly overshoots the commanded value, then may fall below the commanded value, increase again, etc., before the output settles close to the value commanded by the input signal.

Using the terminology of control theory, the vehicle motion curvature $\kappa_{veh}$ input to the block 308 represents system input to the control system 300. The road curvature $\kappa_{road}$ is considered to be a system disturbance, i.e., the road curvature is treated as an exogenous disturbance that can be sense and/or measured.

Equation 12 can be implemented in the block 304 to determine the target vehicle curvature $\kappa_{cmd}$. It is to be understood that Equation 12 represents a lane-centering algorithm which includes both a feedforward term representing road curvature and a feedback term. As such, Equation 12 can be considered to be a generic lane-centering algorithm; it will be understood that, with different coefficient design, Equation 12 can represent various known path following approaches other than discussed in detail herein, including Pure Pursuit, Bezier curves-based planning, or lookahead point design.

$$\kappa_{cmd} = \underbrace{K_{ff}(\kappa_{road} + V_x T_{prev} \kappa'_{road})}_{feedforward\ term} + \underbrace{K_y e_y + K_\psi e_\psi}_{feedback\ term} \tag{12}$$

where $K_{ff}$ is feedforward gain, $T_{prev}$ is a preview time that can be effectively utilized to compensate for actuation delays, $K_y$ is a path offset gain, and $K_\psi$ is a heading offset gain. Note that in some implementations the road curvature rate $$\kappa'_{road}$$

can be omitted, inasmuch as including or omitting $$\kappa'_{road}$$

may not materially affect the obtained value for $\kappa_{cmd}$.

Substituting for $K_{veh}$ in Equation 5 with $\kappa_{cmd}$ from Equation 12, and then combining with Equation 4 gives the following representation of the vehicle-road kinematics:

$$\begin{bmatrix} \dot{e}_y \\ \dot{e}_\psi \end{bmatrix} = V_x \begin{bmatrix} 0 & 1 \\ -K_y & -K_\psi \end{bmatrix} \begin{bmatrix} e_y \\ e_\psi \end{bmatrix} + V_x(1 - K_{ff}) \begin{bmatrix} 0 & 0 \\ 1 & V_x T_{prev} \end{bmatrix} \begin{bmatrix} \kappa_{road} \\ \kappa'_{road} \end{bmatrix} \tag{13}$$

Eigenvalues of the second-order system described by Equation 13 are:

$$\lambda_{1,2} = \frac{V_x K_\psi}{2} \pm V_x \sqrt{K_y} \sqrt{\frac{K_\psi^2}{4K_y} - 1} \tag{14}$$

The eigenvalues of Equation 14 can be used to formulate the feedback gains as described in Equation 12 in terms of traditional closed-loop metrics such as the natural frequency and damping ratio. Specifically, the eigenvalues of Equation 14 can be compared with eigenvalues of the second order system of Equation 13, expressed in terms of the natural frequency $\omega_n$ and damping ratio $\zeta$:

$$\lambda^*_{1,2} = -\omega_n \zeta \pm \omega_n \sqrt{\zeta^2 - 1} \tag{15}$$

Then the derived feedback gains can be given by:

$$K_y = \frac{\omega_n^2}{V_x^2} \tag{16}$$

$$K_\psi = \frac{2\zeta\omega_n}{V_x} \tag{17}$$

Further, instead of the natural frequency as the tuning parameter, in lane-centering applications it is convenient to use alternative time response metrics such as a time (referred to as the transient time) to reach the target value, or some percentage thereof, e.g., 95%, of vehicle 102 curvature, or some percentage, e.g., 5%, of the initial value, if initial value response is considered. This time is referred to as the response time and denoted by $T_r$. In practice, for damping ratios in a range from 0.7 to 0.9, relation between the transient time and closed-loop natural frequency and damping ratio obtained by numerical optimization (with coefficient of determination $R^2$=0.99) is given by:

$$T_r \approx \frac{4.3\zeta}{\omega_n} \tag{18}$$

Now, solving Equation 18 for $\omega_n$ and then substituting for $\omega_n$ in Equations 16 and 17, the feedback gains expressed in terms of the transient time can be obtained:

$$K_y = \frac{18.5\zeta^2}{T_r^2 V_X^2} \tag{19}$$

$$K_\psi = \frac{8.6\zeta^2}{T_r V_x} \tag{20}$$

Figure 6:
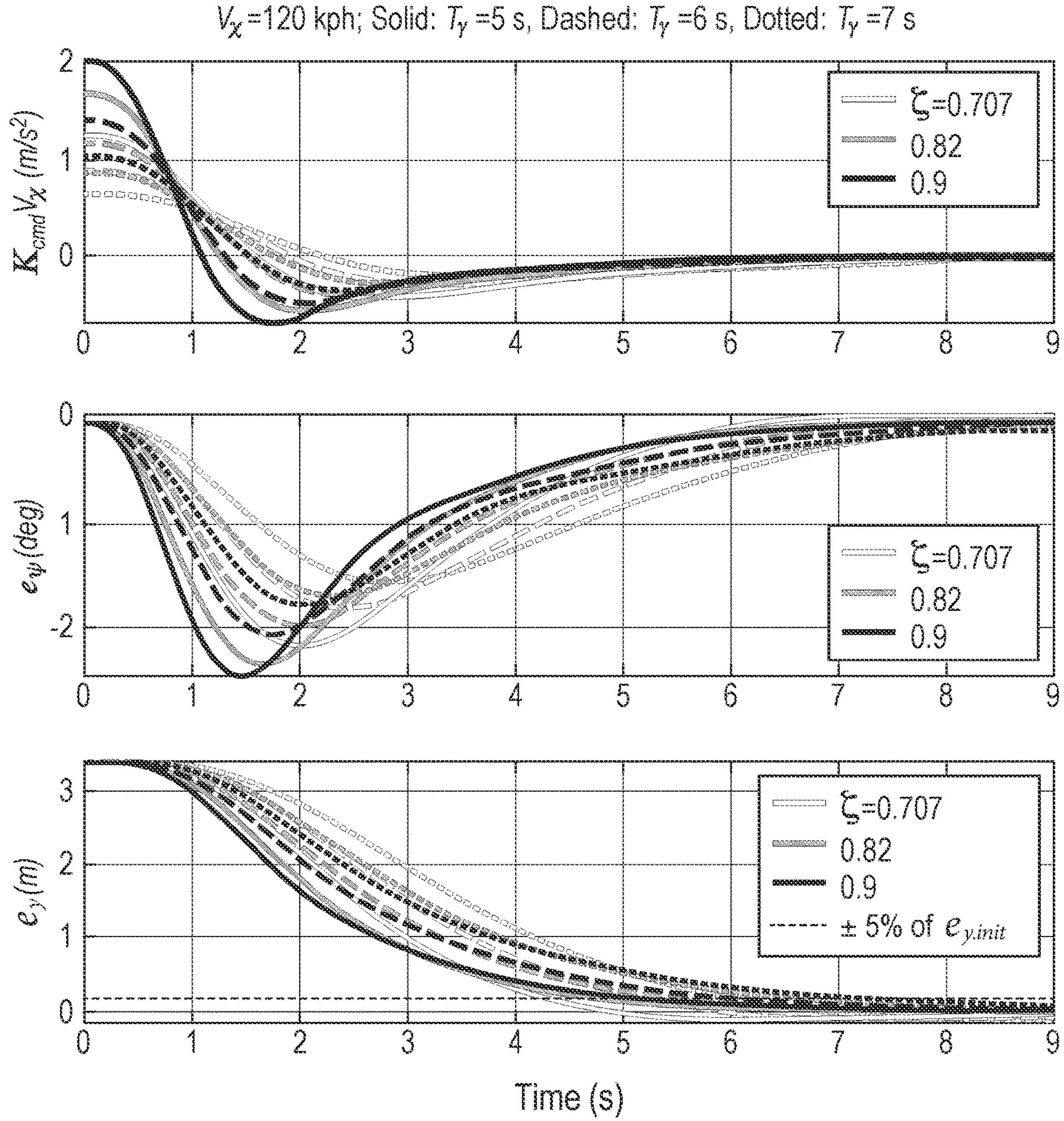
FIG. 6 illustrates example graphs showing vehicle response with non-zero initial conditions with a lateral controller implemented as described herein.

FIG. 6 illustrates example graphs showing vehicle response with non-zero initial conditions with a lateral controller implemented as described above, e.g., the control system 300 of FIG. 3. The response is according to the design parameters with a small response time error for the case with damping ratio ζ=0.707. Thus, benefits of implementing Equations (19) and (20) can be seen; using these equations (or formulas) allows for parameterizing the controller to achieve the desired response time $T_r$. For example, as can be seen in the plot of $e_y$ (lowest of the three graphs in FIG. 6), a simulated vehicle, with various damping values in the range from 0.7 to 0.9, achieved good results for lateral travel, i.e., traveled approximately (i.e., (+/−a tolerance) 3 meters laterally in 5 seconds (solid lines) or in 6 seconds (dashed lines) or in 7 seconds (dotted lines) respectively.

Lane-Changing Examples

To this point, control for lane-centering has been described, i.e., the target vehicle curvature $\kappa_{cmd}$ output from the control system 300 illustrated in FIG. 3 can be used for an ADAS that performs lane-centering. Features of a lane-changing ADAS will now be described, i.e., a control system to support a vehicle 102 changing from a current lane of travel to a target lane, i.e., a lane adjacent (i.e., next to) the current lane of travel to which the vehicle 102 intends to move.

Lane-change control systems can be provided to achieve a smooth lateral movement of a vehicle from current to target lane (i.e., a lane to the left or to the right of a current lane of travel) within a specified time and with small or no overshoot. Lane-changes typically have a duration of in a range of 5 to 7 seconds, with amplitudes of lateral accelerations in a range of 0.4 and 0.8 m/s$^2$ (meters per second squared), when making a lane-change on a straight road.

Executing a lane-change by a vehicle computer 106 can take either of two main approaches. A first approach includes explicit path planning and path following. A second, alternative, approach, integrates path planning and path following with the goal of providing smooth transitioning into a new lane center. The second approach eliminates the need to specify way points and allows reuse of lane-centering control techniques described above. In the case of the second approach with an integrated controller, the path moves from a current lane to a target lane, which introduces a step change in the path offset $e_y$. The lane-centering controller will then follow the resulting new set point by operating the vehicle towards the target lane. To achieve a desired transient time and a desired damping ratio, controller gains can be scheduled according to expressions (19) and (20) where $T_r$ corresponds to the lane-change duration. Benefits of the integrated controller approach include ease of tuning, and efficient adaptation to initial conditions or changing conditions that may arise from lane-change aborts or operator inputs.

Because the integrated controller is linear, the initial curvature command in response to a step change in the set point is large (see FIG. 4), resulting in a noticeable lateral acceleration and jerk. Although the actual acceleration and jerk (i.e., the derivative of acceleration, which in turn is the derivative of speed) will be partially filtered out by vehicle 102 actuation of steering and propulsion, an additional technique for reducing acceleration and jerk will now be described.

More severe initial acceleration and jerk in a lane-change can be overcome by adding amplitude and rate limits to state feedback of the control input, i.e., to constrain the curvature command based on maximum permissible acceleration and/or jerk. These limits should be sufficiently large in order not to affect the performance, e.g., not to cause oscillations or even limit cycle. Suitable techniques, function analysis, can be implemented to ensure stability at the presence of calibrated rate and amplitude limits. For example, as will now be described, it is possible to utilize limits obtained from well-known quintic polynomial path planning techniques.

As is known, a path in a time domain can be described by a quintic polynomial such as:

$$y(t) = a_0 + a_1 t + a_2 t^2 + a_3 t^3 + a_4 t^4 + a_5 t^5. \tag{21}$$

For given initial and final conditions (where $t_f$ is a final time):

$$y(0) = 0,\ \dot{y}(0) = 0,\ \ddot{y}(0) = 0,\ y(t_f) = y_f,\ \dot{y}(0) = 0,\ \ddot{y}(t_f) = 0, \tag{22}$$

where the coefficients are equal to:

$$a_1 = 0,\ a_2 = 0,\ a_3 = 10\ y_f/t_f^3,\ a_4 = -15\ y_f/t_f^4, \text{ and } a_4 = 6y_f/t_f^5. \tag{23}$$

Then from the second derivative of the polynomial, time instances at which lateral acceleration peaks occur are:

$$t_{1,2} = \left(3 \pm \sqrt{3}\right)/6 \cdot t_f \Rightarrow t_1 \approx 0.21 t_f,\ t_2 \approx 0.79\ t_f. \tag{24}$$

Accordingly, the maximum acceleration can be determined to be:

$$a_{y,max} = 5.77\ y_f/t_f^2 \tag{25}$$

Further, the maximum jerk (which occurs at the beginning and end of the lane-change) has magnitude equal to:

$$j_{max} = 60 y_f/t_f^3 \tag{26}$$

Note that these limits or maximums are computed in the lateral acceleration domain, but the controller is given in the curvature domain. The relation between these two domains is straightforward:

$$\kappa = a_y/V_x^2 \text{ and } \dot{\kappa} = j/V_x^2.$$

Figure 7:
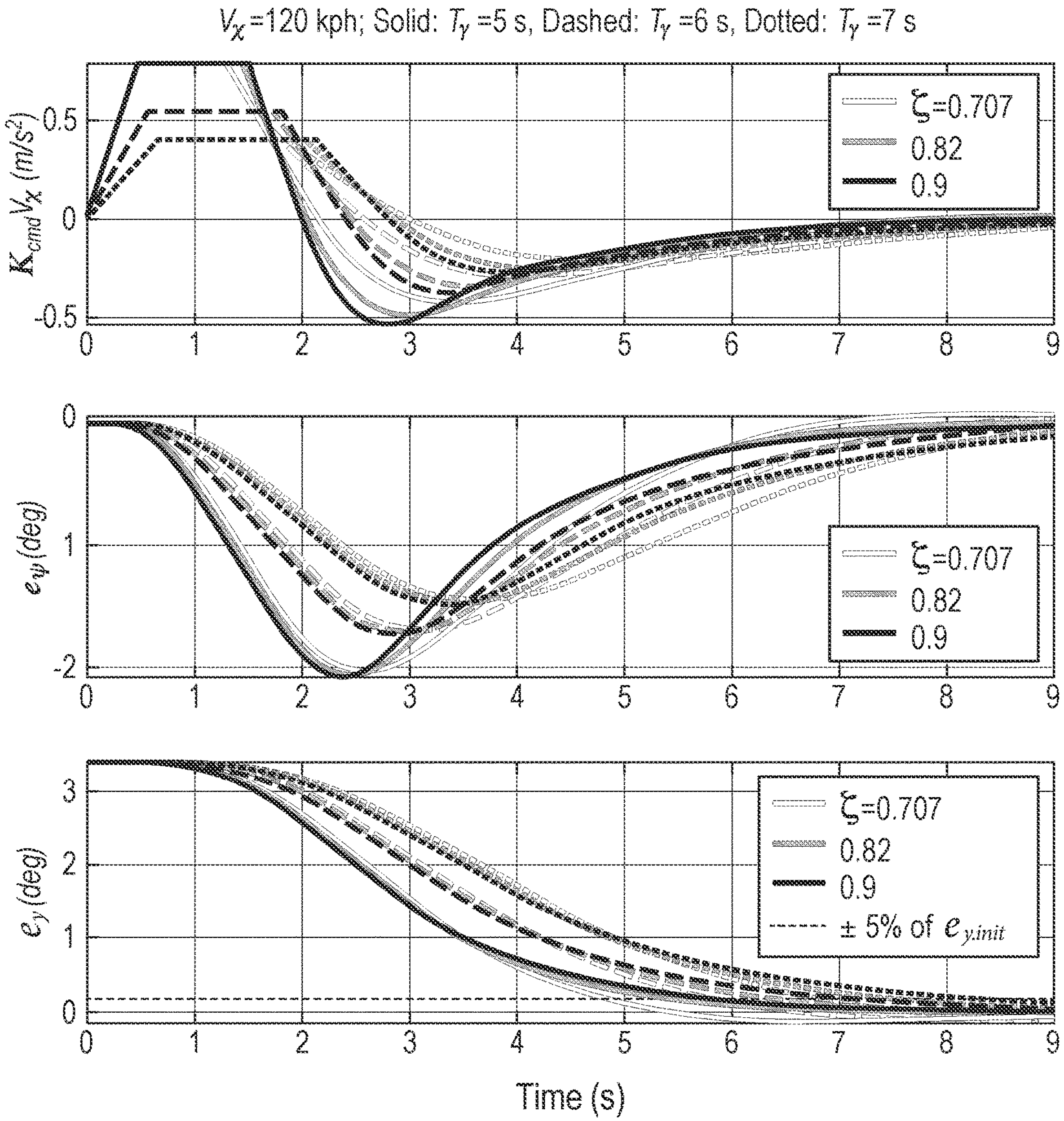
FIG. 7 shows example graphs providing simulation results with amplitude and rate-limiting of the curvature command.

As will be appreciated, lateral acceleration and jerk limits such as obtained above can provide comfortable maneuvering, yet are high enough to prevent oscillations or limit cycles that can be verified by, for example, nonlinear simulations or non-liner control theory methods such as the describing function analysis. As an example, as seen in FIG. 6, of numerical values for lateral acceleration and jerk limits for a typical lane width of 3.4 meters, and a lane-change duration of 6 seconds, the lateral acceleration and jerk limits in such example are $a_{y,max}$=0.54 m/s$^2$ and $j_{max}$=0.94 m/s$^3$. Further for example, FIG. 7 shows simulation results with amplitude and rate limiting of the curvature command. It can be seen that, although there is a major effect on the initial transient response, the target metrics in terms of the duration and damping ratio are preserved.

Figure 4:
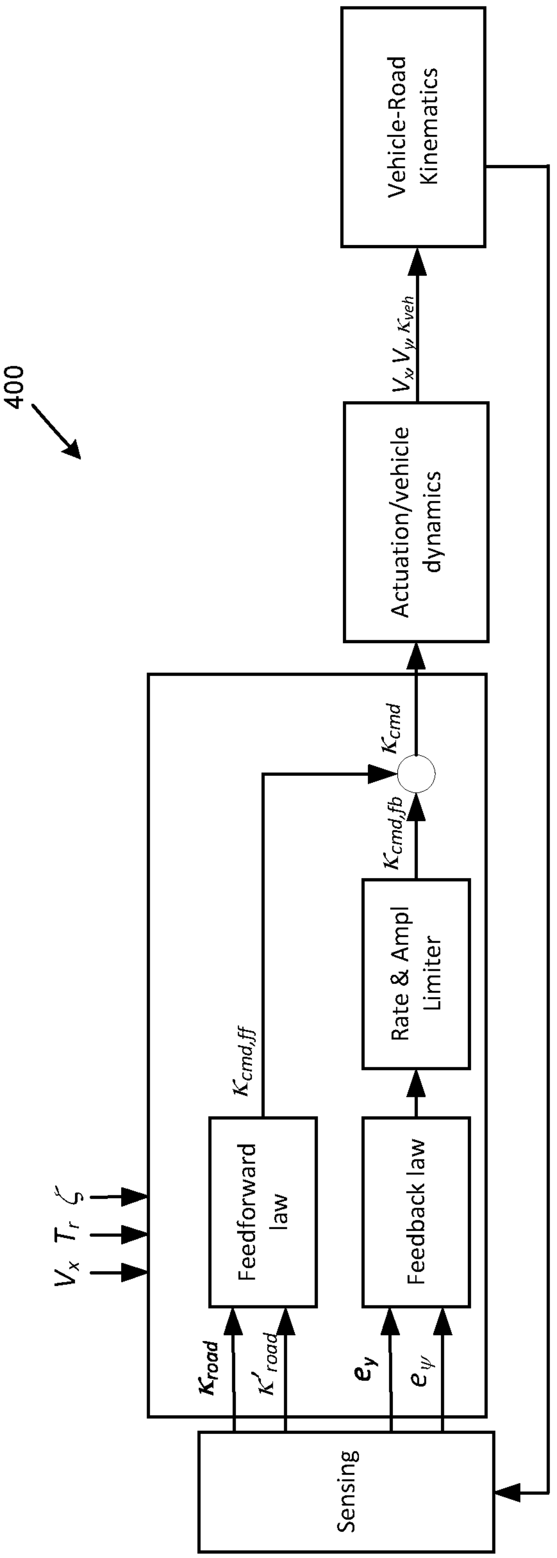
FIG. 4 is block diagram of a lane-change control system with implicit (or integrated) path generation.

FIG. 4 is block diagram of a lane-change control system 400 with implicit (or integrated) path generation. The feed-forward curvature command kind is given by Equation (12). The feedback curvature command $\kappa_{cmd,fb}$ is given by Equations (12), (19), and (20). The rate and amplitude limits are given by Equations (25) and (26). As discussed above with respect to FIG. 3, $\kappa_{Cmb}$ can be output to an actuation/vehicle dynamics block that then outputs to a vehicle-road kinematics block.

Figure 5:
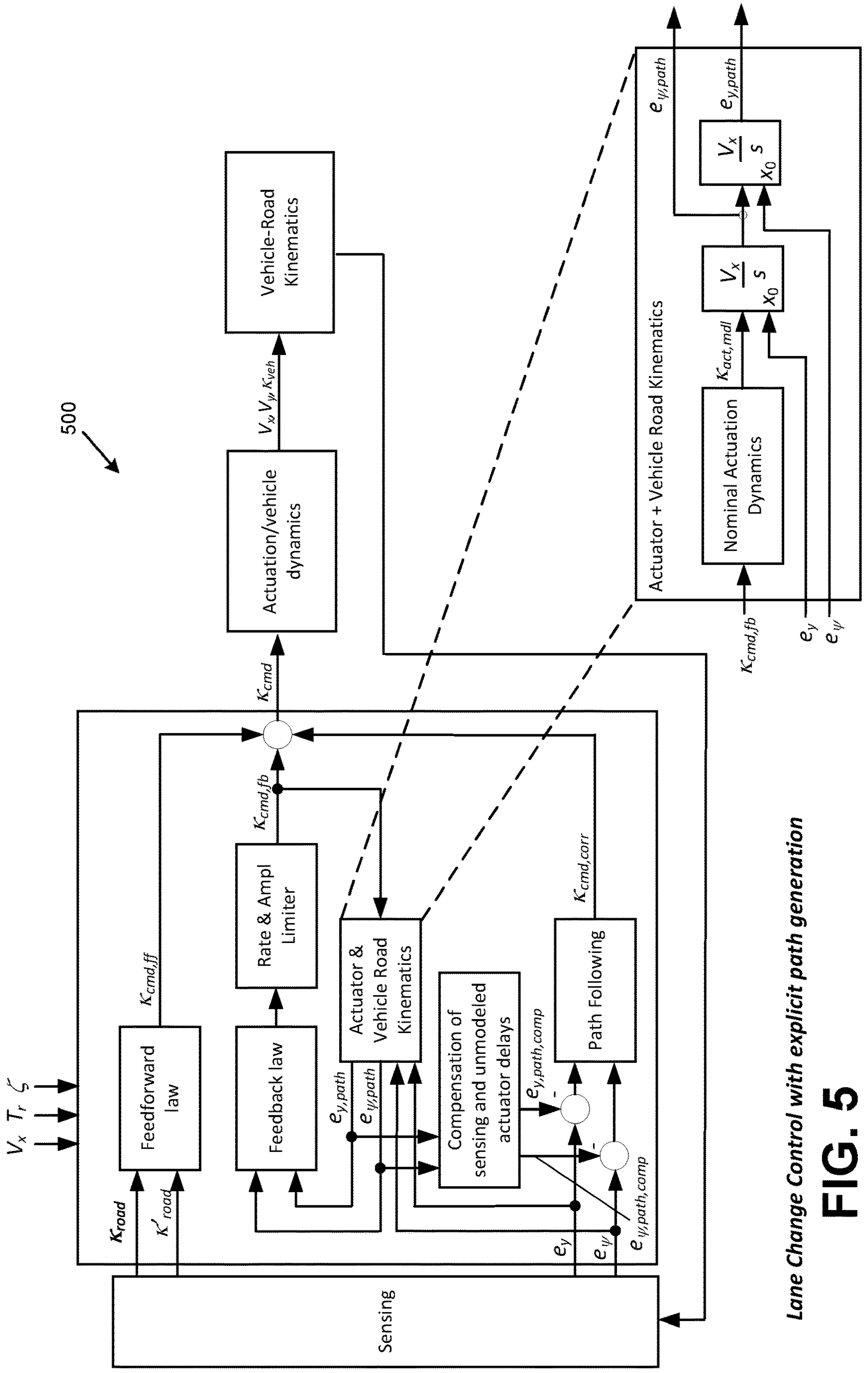
FIG. 5 is a block diagram of an alternative lane-change control system that includes explicit path generation.

FIG. 5 is a block diagram of an alternative lane-change control system 500 that includes explicit path generation. The path is created based on a model of the vehicle and road-vehicle kinematics in same way as shown in the approach with integrated implementation (e.g., FIG. 4). The curvature command in this approach includes an additional correction term, $\kappa_{cmd,corr}$, computed or determined based on errors or differences between measured and desired path and heading offsets (determined from the path generation) in the path-following subsystem. $\kappa_{act,mdl}$ is an estimated actual vehicle curvature due to actuation dynamics. The nominal actuation dynamics can be a first or higher order lag term, pure delay, or their combination, depending on the specific application of the control loop. The nominal actuation dynamics block models the delay (a dynamic relationship including overshoot, settling time, etc., as described above) between the curvature command and the curvature that the vehicle would follow according to the vehicle model. Ideally, this model would correspond perfectly to the actual actuation/vehicle dynamics. In fact, the model only is an approximation of what occurs, but it suffices to describe the physics of vehicle movement for present purposes. Note that the path following can be implemented by the proposed feedback law given by Equations (12), (19), and (20), provided that the bandwidth for the path following is larger than the path generation bandwidth, i.e., $T_{r,path,following}<T_{r,path,generation}$. The explicit path generation implementation includes all properties of the integrated approach and additionally allows for compensation of sensing and unmodeled actuation dynamics in the computation of desired lateral and heading offsets as illustrated in the block diagram.

Example Process

Figure 8:
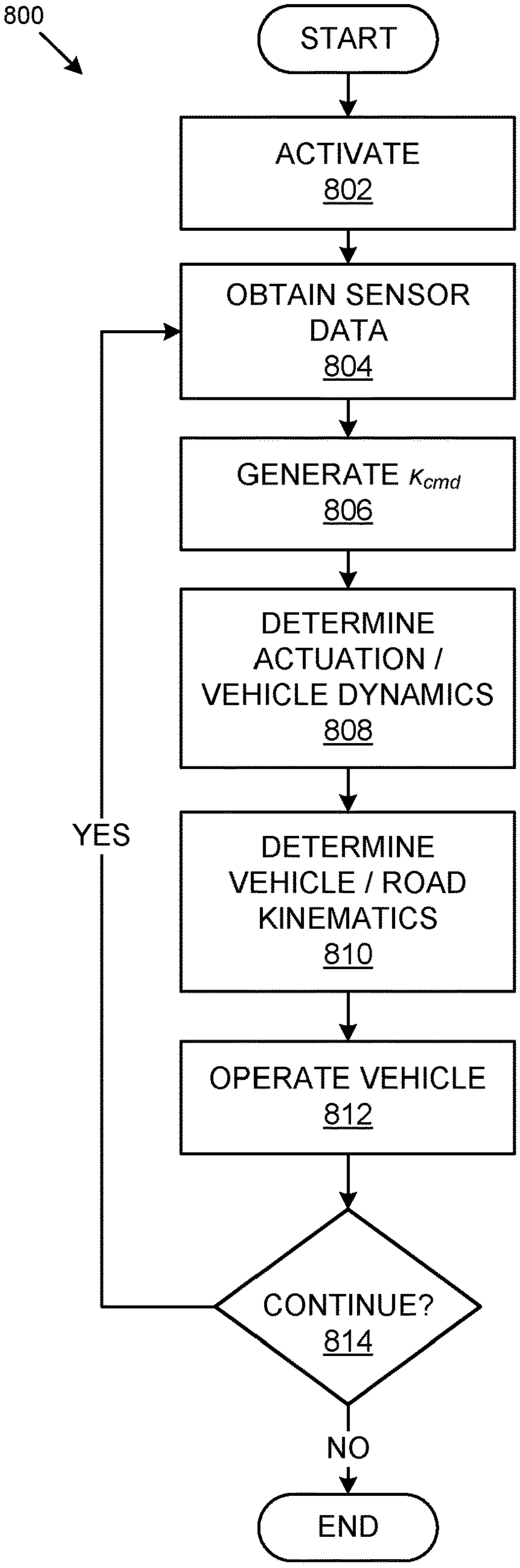
FIG. 8 illustrates an exemplary process for lane-based vehicle operations including lane-centering and/or lane-changing.

FIG. 8 illustrates an exemplary process 800 for lane-based vehicle operations including lane-centering and/or lane-changing. The process 800 can be carried out, for example, by a processor of a vehicle computer 106 according to program instructions stored in a memory thereof.

The process 800 can begin in a block 802, in which an advanced driver assist system (ADAS) that provides lateral control, typically including lane-centering and/or lane-changing, is actuated. For example, the ADAS may be activated by user input, may be activated upon a vehicle transitioning to an ignition-on state, etc.

Next, in a block 804, the computer 106 obtains a vehicle 102 sensor 110 data. For example, sensor 110 data can include vehicle state values as discussed above, e.g., data about a current vehicle speed, acceleration, vehicle curvature, heading, heading offset, etc. As shown above with respect to FIG. 3, sensor data can be determined with respect to vehicle-road kinematics, e.g., values such as a vehicle heading offset from a lane center line are determined with respect to data describing the lane center line.

Next, in a block 806, the computer 106 generates a curvature command as described above.

Next, in a block 808, the computer 106 determines vehicle actuation/dynamics, as described above. That is, measurements of vehicle motion are output with respect to vehicle actuation delays, sensor delays, imprecisions, etc.

Next, in a block 810, the computer 106 determines vehicle/road kinematics, as described above. For example, vehicle-road kinematics takes into account road geometry and also vehicle motion. Vehicle motion is described based on vehicle actuation and dynamics, e.g., longitudinal and lateral velocities of the vehicle based on actuation delays, sensing delays, etc., are used to determine vehicle/road kinematics.

Next, in a block 812, the computer 106 operates the vehicle according to the curvature command, e.g., to center a vehicle in a target lane, to move a vehicle to a target lane, etc. For example, the computer 106 could provide commands to actuate one or more vehicle 102 components such as steering, braking, and/or a propulsion according to the curvature command.

Next, in a block 814, the computer 106 determines whether the process 800 is to continue. For example, input could be received to deactivate the ADAS, a vehicle ignition could transition from an on to an off state, etc. If the process 800 is to continue, the process 800 returns to the block 804. Otherwise, the process 800 ends following the block 814.

CONCLUSION

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in response to, based on, and upon determining herein indicates a causal relationship, not merely a temporal relationship. The adjectives first and second are used throughout this document as identifiers and, unless explicitly stated otherwise, are not intended to signify importance, order, or quantity. The term exemplary is used herein in the sense of signifying an example, e.g., a reference to an exemplary widget should be read as simply referring to an example of a widget.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system for a vehicle, comprising:

a processor and a memory, the memory storing instructions executable by the processor, including instructions to determine a curvature command for a vehicle based on a feedforward control action based on a road curvature and a time to actuate a vehicle component, a feedback control action based on at least one of a path offset or a heading offset of a vehicle with respect to a line defining a target lane, wherein the target lane is adjacent to the current lane of travel; and then operate the vehicle with respect to the line defining the target lane based on the curvature command.

2. The system of claim 1, wherein the line defining the target lane is a center of the target lane.

3. The system of claim 1, wherein the road curvature is determined based on an assumption that the heading offset is less than a specified angle.

4. The system of claim 1, wherein the feedforward control action is further based on a feedforward gain.

5. The system of claim 1, wherein the feedforward control action is further based on a longitudinal speed of the vehicle.

6. The system of claim 1, wherein the feedback control action is further based on the path offset and the heading offset.

7. The system of claim 1, wherein at least one of the path offset or the heading offset are derived in part from a desired closed-loop control system natural frequency and a longitudinal speed of the vehicle.

8. The system of claim 6, wherein the heading offset is derived in part from a desired closed-loop control system damping ratio.

9. The system of claim 6, wherein the heading offset and the path offset are each derived based on a response time to reach a specified percentage of a target path offset value, wherein the response time is based on the desired closed-loop control system natural frequency and a damping ratio.

10. The system of claim 1, wherein determining the curvature command is constrained by at least one of amplitude or rate limits derived in a lateral acceleration domain.

11. The system of claim 1, wherein the curvature command is based in part on a correction term that accounts for differences between measured and desired path and heading offsets determined in a path-following subsystem.

12. The system of claim 1, wherein the desired path and heading offsets are obtained by accounting for actuation and sensing delays.

13. The system of claim 1, wherein a response time for path following is less than a response time for path generation.

14. The system of claim 1, wherein the feedforward control action is further based on a road curvature rate.

15. A method, comprising:

determining a curvature command for a vehicle based on a feedforward control action based on a road curvature and a time to actuate a vehicle component, a feedback control action based on at least one of a path offset or a heading offset of a vehicle with respect to a line defining a target lane, wherein the target lane is adjacent to the current lane of travel; and then operating the vehicle with respect to the line defining the target lane based on the curvature command.

16. The method of claim 15, wherein the feedback control action is further based on the path offset and the heading offset, and wherein at least one of the path offset or the heading offset are derived in part from a desired closed-loop control system natural frequency and a longitudinal speed of the vehicle.

17. A system for a vehicle, comprising:

a processor and a memory, the memory storing instructions executable by the processor, including instructions to determine a curvature command for a vehicle based on a feedforward control action based on a road curvature, determine a feedback control action based on a path offset and a heading offset of a vehicle with respect to a line defining a target lane, wherein the target lane is adjacent to the current lane of travel, and wherein at least one of the path offset or the heading offset are derived in part from a desired closed-loop control system natural frequency and a longitudinal speed of the vehicle; and then operate the vehicle with respect to the line defining the target lane based on the curvature command.

* * * * *